US010631538B2

(12) United States Patent
Bristow

(10) Patent No.: US 10,631,538 B2
(45) Date of Patent: Apr. 28, 2020

(54) COMPOSITION AND METHOD FOR TREATING NEMATODES

(71) Applicant: JIANGSU ROTAM CHEMISTRY CO., LTD., Jiangsu (CN)

(72) Inventor: James Timothy Bristow, Chai Wan (HK)

(73) Assignee: JIANGSU ROTAM CHEMISTRY CO., LTD., Jiangsu (CN)

( * ) Notice: Subject to any disclaimer, the term of this patent is extended or adjusted under 35 U.S.C. 154(b) by 0 days.

(21) Appl. No.: 15/526,747

(22) PCT Filed: Dec. 1, 2015

(86) PCT No.: PCT/CN2015/096101
§ 371 (c)(1),
(2) Date: May 12, 2017

(87) PCT Pub. No.: WO2016/086830
PCT Pub. Date: Jun. 9, 2016

(65) Prior Publication Data
US 2017/0332634 A1 Nov. 23, 2017

(30) Foreign Application Priority Data
Dec. 2, 2014 (GB) .................................. 1421385.4

(51) Int. Cl.
| | | |
|---|---|---|
| *A01N 37/44* | (2006.01) | |
| *C05D 9/02* | (2006.01) | |
| *C05G 3/02* | (2006.01) | |
| *A01N 59/02* | (2006.01) | |
| *A01N 59/10* | (2006.01) | |
| *A01N 59/16* | (2006.01) | |
| *A01N 59/08* | (2006.01) | |
| *A01N 37/46* | (2006.01) | |
| *A01N 59/12* | (2006.01) | |
| *A01N 59/00* | (2006.01) | |
| *A01N 59/14* | (2006.01) | |
| *A01N 59/20* | (2006.01) | |
| *A01N 43/36* | (2006.01) | |
| *A01N 43/50* | (2006.01) | |
| *C05B 17/00* | (2006.01) | |
| *C05C 5/00* | (2006.01) | |

(52) U.S. Cl.
CPC ............. *A01N 37/44* (2013.01); *A01N 37/46* (2013.01); *A01N 43/36* (2013.01); *A01N 43/50* (2013.01); *A01N 59/00* (2013.01); *A01N 59/02* (2013.01); *A01N 59/08* (2013.01); *A01N 59/10* (2013.01); *A01N 59/12* (2013.01); *A01N 59/14* (2013.01); *A01N 59/16* (2013.01); *A01N 59/20* (2013.01); *C05B 17/00* (2013.01); *C05C 5/00* (2013.01); *C05D 9/02* (2013.01); *C05G 3/02* (2013.01)

(58) Field of Classification Search
CPC ........ A01N 37/44; A01N 43/36; A01N 43/50; C05B 17/00; C05C 5/00; C05D 9/02; C05G 3/02
See application file for complete search history.

(56) References Cited

U.S. PATENT DOCUMENTS

| 5,797,976 A | * | 8/1998 | Yamashita | ............... A01G 7/06 71/11 |
|---|---|---|---|---|
| 2014/0179521 A1 | * | 6/2014 | Fuller | ................... A01N 43/16 504/101 |
| 2017/0283334 A1 | * | 10/2017 | Rohrer | ..................... C05D 9/02 |

FOREIGN PATENT DOCUMENTS

| CN | 101125774 A | 2/2008 |
|---|---|---|
| CN | 101347128 A | 1/2009 |
| CN | 102515969 A | 6/2012 |
| CN | 102669184 A | 9/2012 |
| CN | 103288562 A | 9/2013 |
| CN | 103360175 A | 10/2013 |
| CN | 103772069 A | 5/2014 |
| CN | 104058882 A | 9/2014 |
| JP | 2004224677 A | 8/2004 |
| WO | 2012175739 A1 | 12/2012 |

OTHER PUBLICATIONS

Reddy (Indian J Nematol. 5, 1975, 36-41) (Year: 1975).*
Huamin et al. (CN 103553763, English translation), Feb. 5, 2014 (Year: 2014).*
Hongwei et al., CN 103664413 A, published Mar. 26, 2014, see English translation (Year: 2014).*
Fuzhong et al. CN 101891560, published Nov. 24, 2010, see English translation (Year: 2010).*
Fuzhong et al., CN 101906002, published Dec. 8, 2010, English translation (Year: 2010).*
ChEBI, 2007, p. 1-4 (Year: 2007).*
C.I.H. Descriptions of Plant-parasitic Nematodes (Set 6, No. 77, Plant-parasitic Nematodes, 1976, p. 1-3) (Year: 1976).*
Hoque et al. (Archives of Phytopathology and Plant Protection, 2014, 47, 16, 1921-1928) (Year: 2014).*
Solubor (Product Data Sheet, 2012) (Year: 2012).*
Cameron (Canadian J of Comparative Medicine, Sep. 1939). (Year: 1939).*
Written Opinion and SSearch Report for PCT/CN2015/096101 dated Mar. 8, 2016.
Combined Search and Examination Report dated May 27, 2015.

* cited by examiner

*Primary Examiner* — Umamaheswari Ramachandran
(74) *Attorney, Agent, or Firm* — Dickinson Wright PLLC

(57) ABSTRACT

A nematicidal fertilizer composition comprising one or more amino acids and one or more micronutrient compounds. A method of controlling nematodes at a locus is also provided. The method comprises applying to the locus one or more amino acids and one or more micronutrient compounds.

22 Claims, No Drawings

COMPOSITION AND METHOD FOR TREATING NEMATODES

This application is a 371 national phase entry of PCT/CN2015/096101 filed 1 Dec. 2015, which claims benefit of GB Application No. 1421385.4, filed 2 Dec. 2014, the entire contents of which are incorporated herein by reference for all purposes.

BACKGROUND

1. Technical Field

The present invention relates to a method for controlling and combating nematodes. The present invention further relates to a nematicidal composition for achieving the same.

2. Related Art

Nematodes are small worms which are almost transparent and invisible to the naked eye. Nematodes are generally from 0.3 to 3.0 millimeters in length. Although nematodes are small in size, they cause about 12% of the annual losses to agricultural production, which corresponds to millions of dollars in lost crops (SASSER & FRECKMAN, 1987). Nematodes typically feed on the roots or shoots of plants. They reduce absorption and transportation of water and nutrients. A range of plants can be host to nematodes, including such crops as sugarcane, soybean, corn, coffee and cotton. Nematodes attack in the field in the form of spots/coppices and rarely spread throughout the field. The plants being attacked by nematodes may show symptoms of nutritional deficiency and reduced or slower development than healthy plants. Sampling and carrying out laboratorial analyses of soil and roots are required for confirmation of the existence of nematodes.

Current methods for controlling nematodes are very limited. One example of a commonly applied treatment is exposing infested soil to heat by the use of steam. However, steam treatment is technically difficult and costly for general application in the field.

An alternative to steam treatment is to use chemical nematicides. An issue with using chemical nematicides is the danger associated with the production and use of the active chemical nematicide ingredients. The active ingredients can be toxic and may lead to death. As a result, a number of countries have restricted the use of certain nematicides, for example methyl bromide.

Accordingly, there is a significant need for an improved technique for controlling nematodes in crops, in particular a nematicidal composition and a method of controlling nematodes, as well as other plant pests and pathogens. It would be an advantage if the nematicidal composition is easy to use and less costly to produce and employ than known treatment techniques.

SUMMARY

The present invention provides a safe and effective way to control and combat nematodes.

It has now surprisingly been found that a fertilizer composition comprising one or more amino acids and one or more micronutrients is active results in controlling and combating a wide range of nematodes in crops. In particular, the aforementioned fertilizer composition exhibits a high activity in controlling Pratylenchus zeae, Meloidogyne javanica, Pratylenchus brachyurus, Meloidogyne exigua, Meloidogyne incognita, Heterodera glycines, Rotylenchulus reniformis nematodes in a wide range of crops, such as sugarcane, soybean, coffee, corn and cotton.

Accordingly, in a first aspect, the present invention provides a nematicidal fertilizer composition comprising one or more amino acids and one or more micronutrients.

In a further aspect, the present invention provides a method for controlling nematodes in plants at a locus, the method comprising applying to the locus one or more amino acids and one or more micronutrients.

In a still further aspect, the present invention provides the use of a combination of one or more amino acids and one or more micronutrients in the control of nematodes.

DETAILED DESCRIPTION OF EXAMPLE EMBODIMENTS

In general, the present invention provides a method for controlling nematodes comprising applying to a plant, a plant part or surrounding an effective amount of an anti-nematode composition comprising one or more amino acids and one or more micronutrients. The present invention is of particular use for controlling Pratylenchus zeae, Meloidogyne javanica, Pratylenchus brachyurus, Meloidogyne exigua, Meloidogyne incognita, Heterodera glycines, Rotylenchulus reniformis.

"Plant" as used herein, refers to all plant and plant populations, such as desired and undesired wild plants or crop plants.

"Plant parts" as used herein, refers to all parts and organs of plants, such as shoots, leaves, needles, stalks, stems, fruit bodies, fruits, seeds, roots, tubers and rhizomes. Harvested materials, and vegetative and generative propagation materials, for example, cuttings, tubers, meristem tissue, rhizomes, offsets, seeds, single and multiple plant cells and any other plant tissues, are also included.

The word "surrounding" refers to the place at which the plants are growing, the place on which the plant propagation materials of the plants are sown or the place on which the plant propagation materials of the plants will be sown.

The anti-nematode fertilizer composition of the present invention comprises one or more amino acids and one or more micronutrients. It is an advantage that the anti-nematode composition is active in the control of nematodes without the need for an additional nematicidal agent. Accordingly, it is preferred that the composition and method of the present invention employs no additional nematicide, insecticide, herbicide or fungicide.

The composition of the present invention comprises one or more amino acids. The amino acids may be present in the anti-nematode fertilizer in any suitable amount to provide the anti-nematicidal effect, and are generally present in an amount of from about 5% to about 70% by weight of the composition, preferably from about 5% to about 40% by weight of the composition, more preferably from about 5% to about 20% by weight of the composition, more preferably still from about 10% to about 15% by weight of the composition.

In some preferred embodiments, the amount of amino acids is equal to or more than about 10% by weight of the composition.

The concentration of amino acids in the composition is preferably at least 100 g/L. Embodiments of the composition comprising amino acids in a concentration of about 120 g/L.

A wide range of amino acids are active in the control of nematodes. Suitable amino acids include, but are not limited to, alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, L-Alanine, L-Arginine, L-Aspartic acid, L-Cystine, L-Glutamic acid, Glycine, L-Histidine, L-Isoleucine, L-Leucine, L-Lysine, L-Methionine, L-Phenylalanine, L-Proline, L-Serine, L-Threonine, L-Tyrosine, and L-Valine.

The composition may comprise a single amino acid. More preferably, the composition comprises a mixture of two or more amino acids.

The composition of the present invention further comprises one or more micronutrients. The micronutrients may be present in the composition in any suitable amount, and are generally present in an amount of from about 1% to about 30% by weight of the composition, preferably from about 1% to about 20% by weight of the composition, more preferably from about 5% to about 15% by weight of the composition.

In some preferred embodiments, the amount of micronutrients is equal to or more than about 4% by weight of the anti-nematode fertilizer.

The micronutrients preferably comprise one or more ionic compounds, for example ionic compounds containing ions of metals of Groups IA, IB, IIA, IIB, IIIA, VIA, VIB, VIIA, VIIB, and VIII of the Periodic Table. Preferred ions include cobalt (Co), copper (Cu), iron (Fe), manganese (Mn), zinc (Zn), boron (B), halogens, preferably chlorine (Cl) and iodine (I), molybdenum (Mo), alkali metals, preferably potassium (K) and sodium (Na), and selenium (Se). Further preferred ions include sulphates, borates, polyphosphates, phosphates and nitrates. Suitable borates include perborates, pentaborates, triborates, tetraborates, octaborates and metaborates.

Preferably, the present invention employs a plurality of micronutrient compounds. More preferably, the present invention employs micronutrient compounds containing at least zinc, sulphate, sodium, and borate ions. More preferably still, the micronutrient compounds contain copper (Cu), iron (Fe), manganese (Mn), zinc (Zn), sodium (Na), sulphate, and borate ions.

The micronutrients may be used in the form of salts. Suitable salts include anhydrous salts and/or hydrates. Examples of suitable salts include, but are not limited to, cobalt sulphate, copper sulphate, iron sulphate, manganese sulphate, zinc sulphate, cobalt chloride, copper chloride, iron chloride, manganese chloride, zinc chloride, cobalt molybdate, copper molybdate, iron molybdate, manganese molybdate, zinc molybdate, cobalt nitrate, copper nitrate, iron nitrate, manganese nitrate, zinc nitrate, and sodium borates, including sodium tetraborate, disodium tetraborate, borax, sodium pentaborate, sodium triborate, sodium metaborate, disodium ocataborate and sodium perborate.

The salts of the micronutrient may be hydrated.

In one preferred embodiment, the micronutrients contain salts of both zinc and boron. In such cases, the zinc and boron salts are present in an amount of from about 1% to about 30% by weight of the composition, preferably from about 1% to about 20% by weight of the composition, more preferably from about 2% to about 10% by weight of the composition.

The composition preferably comprises the micronutrient compounds in a total amount of at least 20 g/L, more preferably at least 50 g/L, still more preferably at least 75 g/L. Concentrations of micronutrients of about 100 g/L are suitable for many embodiments.

Particularly preferred micronutrients are those comprising one or both of a sodium borate, in particular disodium octaborate, preferably in the form of disodium octaborate tetrahydrate, and a zinc salt, in particular zinc sulphate.

In the preferred embodiment employing a sodium borate and a zinc salt, the sodium borate and zinc salt are preferably present in a weight ratio of from 1:6 to 4:1, more preferably from 1:5 to 2:1, still more preferably from 1:4 to 1:1. A weight ratio of about 1:3 is particularly preferred for many embodiments.

For example, in one embodiment, the composition comprises from 10 to 40 g/L disodium octaborate, more preferably from 20 to 30 g/L disodium octaborate, still more preferably from 24 to 28 g/L disodium octaborate. Similarly, in one embodiment, the composition comprises from 50 to 100 g/L zinc sulphate, preferably from 60 to 90 g/L zinc sulphate, more preferably from 70 to 80 g/L zinc sulphate, still more preferably from 72 to 75 g/L zinc sulphate. In one preferred embodiment, the composition comprises 25.5 g/L disodium octaborate and 73.5 g/L zinc sulphate.

In another preferred embodiment, the micronutrients comprise salts containing zinc, borate, copper, manganese and iron ions.

In one preferred embodiment, the composition comprises zinc salts in a concentration of from 5 to 30 g/L, preferably from 10 to 20 g/L, still more preferably from 15 to 20 g/L. A preferred zinc salt is zinc sulphate.

Similarly, in one preferred embodiment, the composition comprises a borate in a concentration of from 5 to 50 g/L, preferably from 10 to 30 g/L, still more preferably from 20 to 25 g/L. A preferred borate is disodium octaborate.

Similarly, in one preferred embodiment, the composition comprises an iron salt in a concentration of from 5 to 30 g/L, preferably from 10 to 25 g/L, more preferably from 15 to 25 g/L. A preferred iron salt is iron sulphate.

Similarly, in one preferred embodiment, the composition comprises a manganese salt in a concentration of from 5 to 50 g/L, preferably from 10 to 30 g/L, more preferably from 15 to 25 g/L. A preferred manganese salt is manganese sulphate.

Similarly, in one preferred embodiment, the composition comprises a copper salt in a concentration of from 5 to 30 g/L, preferably from 10 to 20 g/L, more preferably from 15 to 20 g/L. A preferred copper salt is copper sulphate.

In one preferred embodiment, the composition comprises 17.5 g/L zinc sulphate, 19.9 g/L iron sulphate, 24 g/L disodium octaborate, 23 g/L manganese sulphate monohydrate and 15.7 g/L cooper sulphate.

The amino acids and micronutrients together may be present in the composition in any suitable amount, and are generally present in a total amount of both amino acids and micronutrients of from about 5% to about 95% by weight of the composition, preferably from about 10% to about 75% by weight of the composition, more preferably from about 10% to about 50% by weight of the composition and more preferably still from about 15% to about 40% by weight.

In some embodiments, the composition according to the present invention comprises (i) about 5% to about 40% of amino acids by weight of the composition; and (ii) about 1% to about 20% of micronutrients by weight of the composition.

In certain embodiments, the composition according to the present invention comprises (i) equal to or more than 10% of amino acids by weight of the composition; and (ii) equal to or more than about 4% of micronutrients by weight of the composition.

In some embodiments, the composition according to the present invention comprises (i) equal to or more than 10% of amino acids by weight of the composition; and (ii) equal to or more than about 4% of micronutrients by weight of the composition; wherein the micronutrients comprise zinc (Zn), sulphate, sodium (Na), and borate ions.

In certain embodiments, the composition according to the present invention comprises (i) equal to or more than about 10% of amino acids by weight of the composition; and (ii) equal to or more than about 4% of micronutrients by weight of the composition; wherein the micronutrients comprises copper (Cu), iron (Fe), manganese (Mn), zinc (Zn), sodium (Na), sulphate, and borate ions.

As noted above, the present invention provides the use of a combination of one or more amino acids and one or more micronutrients in combating nematodes. The amino acids and micronutrients may be applied together, for example in the form of a composition of the present invention, or may be applied separately to the plants to be treated or their surrounding. If applied separately, the components may be applied at the same time or consecutively.

The amino acids and micronutrients may be applied in any amounts relative to each other sufficient to achieve the required control of nematodes. In particular, the weight ratio of the amino acids and micronutrients as applied is preferably in the range of from about 20:1 to about 1:20, more preferably from about 10:1 to about 1:10, still more preferably from about 5:1 to about 1:5, more preferably still from about 1.5:1 to about 1:1.5. In some embodiments, the weight ratio of the amino acids to micronutrients as applied is about 1.2:1.

The compositions of the present invention may further comprise one or more auxiliaries. The auxiliaries employed in the anti-nematode fertilizer will depend upon the type of formulation and/or the manner in which the formulation is to be applied by the end user. Formulations incorporating the composition of the present invention are described hereinafter. Suitable auxiliaries which may be comprised in the composition according to the invention are all customary formulation adjuvants or components, such as extenders, carriers, solvents, surfactants, stabilizers, anti-foaming agents, anti-freezing agents, preservatives, antioxidants, colorants, thickeners, solid adherents and inert fillers. Such auxiliaries are known in the art and are commercially available. Their use in the formulation of the composition of the present invention will be apparent to the person skilled in the art. In addition, depending upon the formulation, the composition according to the invention may also comprise water. The composition can be formulated as a liquid or a dry formulation.

The composition and method of the present invention can be used in the agricultural sector and related fields of use for controlling and combating a wide range of nematodes, for example, but not limited to:

*Pratylenchus zeae, Meloidogyne javanica, Pratylenchus brachyurus, Meloidogyne exigua, Meloidogyne incognita, Heterodera glycines, Rotylenchulus reniformis.*

The composition and method of to the present invention are suitable for the protection of plants of a wide range of crops, including cereals, for example wheat, barley, rye, oats, corn, rice, sorghum, triticale and related crops; fruit, such as pomes, stone fruit and soft fruit, for example apples, grapes, pears, plums, peaches, almonds, pistachio, cherries, and berries, for example strawberries, raspberries and blackberries; leguminous plants, for example beans, lentils, peas, and soybeans; sugarcanes; oil plants, for example rape, mustard, and sunflowers; cucurbitaceae, for example marrows, cucumbers, and melons; fibre plants, for example cotton, flax, hemp, and jute; citrus, for example calamondin, citrus citron, citrus hybrids, including chironja, tangelo, and tangor, grapefruit, kumquat, lemon, lime, mandarin (tangerine), sour orange, sweet orange, pummelo, and satsuma mandarin; vegetables, for example spinach, lettuce, asparagus, cabbages, carrots, onions, tomatoes, potatoes, and paprika; coffee; as well as ornamentals, including flowers, such as roses, shrubs, broad-leaved trees and evergreens, for example conifers. The composition and method of the present invention are particularly advantageous when applied to leguminous plants, sugarcanes, fibre plants, cereals, soybean, corn, cotton and coffee.

The composition and method of the present invention exhibit surprisingly high effectiveness in controlling and combating *Pratylenchus zeae, Meloidogyne javanica, Pratylenchus brachyurus, Meloidogyne exigua, Meloidogyne incognita, Heterodera glycines, Rotylenchulus reniformis*, in particular in sugarcane, soybean, coffee, corn and cotton.

In one embodiment, the composition and method of the present invention are also particularly effective in controlling and combating *Pratylenchus zeae, Meloidogyne javanica, Pratylenchus brachyurus, Meloidogyne exigua, Meloidogyne incognita, Heterodera glycines, Rotylenchulus reniformis* in soybeans and sugarcanes. The method and composition may be applied to the plant parts and/or surrounding, in particular by applying a composition comprising (i) equal to or more than 10% amino acids by weight of the composition; and (ii) equal to or more than about 4% micronutrients by weight of the composition; wherein the micronutrients comprise zinc, sulphate, sodium, and borate ions.

In a further embodiment, the composition and method of the present invention are also particularly effective in controlling and combating *Pratylenchus zeae, Meloidogyne javanica, Pratylenchus brachyurus, Meloidogyne exigua, Meloidogyne incognita, Heterodera glycines, Rotylenchulus reniformis* in sugarcane, soybean, coffee, corn and cotton. The method and composition may be applied to the plant parts and/or surrounding, in particular by applying composition comprising (i) equal to or more than 10% amino acids by weight of the composition; and (ii) equal to or more than about 4% micronutrients by weight of the composition; wherein the micronutrients comprise copper (Cu), iron (Fe), manganese (Mn), zinc (Zn), sodium (Na), sulphate, and borate ions.

In use of the present invention, the rates of application of the combination of amino acids and micronutrient may vary, for example, according to such factors as the type of use, the type of plants, temperature, humidity, the type of nematode being controlled, soil type, and pH of the soil. The application rate of the combination of amino acids and micronutrients for a given set of conditions can readily be determined by routine trials. The formulations, either straight, that is undiluted, or diluted with a suitable solvent, especially water, plants, may be applied to plant parts and/or the surrounding by methods known in the art, including spraying, pouring, dipping, injection, irrigation, immersing and the like.

Generally, the combination of one or more amino acids and one or more micronutrients may be applied to the locus being treated at a range of application rates. The application will depend upon such factors as the type of treatment being applied.

For example, when applying the amino acids and the micronutrients by way of a spray, the application rates of the spray are preferably 0.1 to 10 litres per hectare (L/ha), more preferably from 0.5 to 5 L/ha.

In the spray treatment, amino acids may be applied at an application rate of from 5 gram per hectare (g/ha) to 2000 g/ha, more preferably from 10 g/ha to 1000 g/ha, still more preferably from 10 to 600 g/ha. Similarly, micronutrients may be applied at an application rate of from 1 g/ha to 2000 g/ha, more preferably from 2 g/ha to 1000 g/ha, still more preferably from 2 g/ha to 600 g/ha.

When applying the amino acids and micronutrients as a seed treatment, the application rate may be from 10 mL to 1000 mL per 100 kg of seeds.

In the seed treatment, amino acids may be applied at a rate of from 0.5 to 200 g per 100 kg of seeds, more preferably from 1 to 100 g per 100 kg of seeds, still more preferably from 1 to 80 g per 100 kg of seeds. Similarly, micronutrients may be applied at an application rate of from 0.1 to 200 g per 100 kg of seeds, more preferably from 0.2 to 100 g per 100 kg of seeds, still more preferably from 0.2 to 80 g per 100 kg of seeds.

The amino acids and micronutrients can be applied to the plants, plant parts and/or surrounding where control is desired either simultaneously or in succession at short intervals, for example on the same day. The amino acids and micronutrients may be applied to the plant, plant parts, or surrounding in any order. Amino acids and micronutrients may be applied just once or a plurality of times, for example, from 2 to 5 times, more preferably 3 times.

In the event amino acids and micronutrients are applied simultaneously in the present invention, they may be applied as composition containing both the amino acids and the micronutrients, in which case the amino acids and the micronutrients may be obtained from a separate formulation source and mixed together, known in the art as a tank-mix, a ready-to-apply, a spray broth, or a slurry, or the amino acids and the micronutrients may be obtained as a single formulation mixture source, known in the art as a pre-mix, a concentrate, or a formulated product. An example of such a formulated product is the composition described above and hereinafter.

The compositions according to the present invention are distinguished by being especially well tolerated by plants and by being environmentally friendly.

Embodiments of the present invention are now described, for illustrative purposes only, by way of the following examples. Where not otherwise specified throughout this specification and claims, percentages are by weight.

EXAMPLE 1—*Pratylenchus zeae*—Sugarcane

A nematode inoculum was prepared from a pure subpopulation of *Pratylenchus zeae* recovered from sugarcane crops located in Pacaembú-State of São Paulo-Brazil. The subpopulation was multiplied from corn plants (*Zea mays* L.) 'DKB 390 PRO' in clay recipients in a greenhouse. The subpopulation was previously identified based on morphological characters of adult females mounted in temporary slides by using a dicotomic key created by SANTOS et al. (2005).

3 mL samples of the compositions summarised in Table 1 below were applied uniformly on the soil and around the roots at the rate of 2 L/ha. Thereafter, the roots of the sugarcane were inoculated with 10 mL of a suspension containing *Pratylenchus zeae* in various stages of development, after which the roots were covered with soil. 5 replicates were carried out.

TABLE 1

| Samples: | Weight (%) by the weight of the anti-nematode composition |
|---|---|
| 1. Anti-nematode composition | 12% amino acids; 10% micronutrients (zinc sulphate, sodium borate complex, iron sulphate, manganese sulphate and copper sulphate); 10% auxiliaries (including solvent, surfactant and stabilizer) in water |
| 2. Anti-nematode composition | 12% amino acids; 10% micronutrients (zinc sulphate and sodium borate complex); 10% auxiliaries (including solvent, surfactant and stabilizer) in water |
| 3. Control | 0% amino acids; 0% micronutrients; 10% auxiliaries (including solvent, surfactant and stabilizer) in water |

After 15 and 30 days, the phytotoxic effects of the treatment were evaluated. No symptoms of phytotoxicity in the sugarcane plants were observed.

The number of *Pratylenchus zeae* in various developmental stages in the roots and the number of *Pratylenchus zeae* in various developmental stages in 10 grams of root material were counted at 45 and 90 days after application. The results are set out in Table 2 below.

TABLE 2

| Samples | Number of *Pratylenchus zeae* in various development stages in roots | | Number of *Pratylenchus zeae* in various development stages in 10 grams of roots | |
|---|---|---|---|---|
| | Day 45 (Days after application) | Day 90 (Days after application) | Day 45 (Days after application) | Day 90 (Days after application) |
| 1. Anti-nematode composition | 469 | 415.2 | 134.6 | 850 |
| 2. Anti-nematode composition | 421 | 384.4 | 90.4 | 608 |
| 3. Control | 607 | 2668.8 | 1142.4 | 1548.4 |

As can be seen, treatment of the sugarcane plants with the anti-nematode composition comprising amino acids and micronutrients significantly reduced the number of nematodes present in the roots of the plants, compared with the Control.

EXAMPLE 2—*Pratylenchus zeae* and *Meloidogyne javanica*—Sugarcane

A nematode inoculum was prepared from a pure subpopulation of *Meloidogyne javanica* kept in soybean plants (*Glycine max* L.) in clay recipients in a greenhouse. The subpopulation was previously identified based on morphological characters of perineal patterns prepared as per TAYLOR & NETSCHER (1974), on the morphology of the mouth region of males (EISENBACK et al., 1981), and on the isoenzymatic phenotype for esterasis obtained from the technique by ESBENSHADE & TRIANTAPHYLLOU (1990), using a traditional vertical electrophoresis system, namely Mini Protean II by BIO-RAD.

3 mL samples of the compositions summarised in Table 3 below were applied uniformly on the soil and around the roots at the rate of 2 L/ha. Thereafter, the roots of the sugarcane plants were inoculated with 10 mL of a suspension containing 5000 eggs (*Pratylenchus zeae* and *Meloidogyne javanica*) and second-stage juveniles of *Meloidogyne*

*javanica*, after which the roots were covered with soil. 5 replicates were carried out. Analysis showed *Meloidogyne javanica* and *Pratylenchus zeae* to be present in a suspension of extracted roots.

TABLE 3

| Samples: | Weight (%) by the weight of the anti-nematode composition |
|---|---|
| 1. Anti-nematode composition | 12% amino acids; 10% micronutrients (zinc sulphate, sodium borate complex, iron sulphate, manganese sulphate and copper sulphate); 10% auxiliaries (including solvent, surfactant and stabilizer) in water |
| 2. Anti-nematode composition | 12% amino acids; 10% micronutrients (zinc sulphate and sodium borate complex); 10% auxiliaries (including solvent, surfactant and stabilizer) in water |
| 3. Control | 0% amino acids; 0% micronutrients; 10% auxiliaries (including solvent, surfactant and stabilizer) in water |

After 15 and 30 days, the phytotoxic effects of the treatment were evaluated. No symptoms of phytotoxicity in the sugarcane plants were observed.

The number of *Meloidogyne javanica* and *Pratylenchus zeae* in various development stages in the plant roots; the number of *Meloidogyne javanica* and *Pratylenchus zeae* in various development stages in 10 grams of root material; the number of eggs (*Pratylenchus zeae* and *Meloidogyne javanica*) in the plant roots; and the number of eggs (*Pratylenchus zeae* and *Meloidogyne javanica*) in 10 grams of root material were counted at 100 and 150 days after application. The results are set out in Tables 4 to 6 below.

TABLE 4

| | Number of *Meloidogyne javanica* in various development stages in roots | | Number of *Meloidogyne javanica* in various development stages in 10 grams of roots | |
|---|---|---|---|---|
| Samples | Day 100 (Days after application) | Day 150 (Days after application) | Day 100 (Days after application) | Day 150 (Days after application) |
| 1. Anti-nematode Composition | 0.00 | 56.00 | 0.00 | 2.30 |
| 2. Anti-nematode Composition | 0.00 | 60.00 | 0.00 | 4.00 |
| 3. Control | 3808.00 | 416.00 | 313.90 | 26.77 |

TABLE 5

| Samples | Number of *Pratylenchus zeae* in various development stages in roots Day 150 (Days after application) | Number of *Pratylenchus zeae* in various development stages in 10 grams of roots Day 150 (Days after application) |
|---|---|---|
| 1. Anti-nematode Composition | 2836.00 | 219.18 |
| 2. Anti-nematode Composition | 2604.00 | 199.61 |
| 3. Control | 7896.00 | 475.02 |

TABLE 6

| | Number of eggs (*Pratylenchus zeae* and *Meloidogyne javanica*) in roots | | Number of eggs (*Pratylenchus zeae* and *Meloidogyne javanica*) in 10 grams of roots | |
|---|---|---|---|---|
| Samples | Day 100 (Days after application) | Day 150 (Days after application) | Day 100 (Days after application) | Day 150 (Days after application) |
| 1. Anti-nematode Composition | 0.00 | 64.00 | 0.00 | 4.70 |
| 2. Anti-nematode Composition | 0.00 | 55.00 | 0.00 | 3.20 |
| 3. Control | 12160.00 | 764.00 | 755.90 | 25.40 |

As can be seen, treatment of the sugarcane plants with the anti-nematode composition comprising amino acids and micronutrients significantly reduced the number of nematodes present in the roots of the plants, compared with the Control.

EXAMPLE 3 *Meloidogyne javanica*—Soybean

A nematode inoculum was prepared from a pure subpopulation of *Meloidogyne javanica* kept from tomato (*Solanum lycopersicom* L.) in clay recipients in a greenhouse. The subpopulation was previously identified based on morphological characters of perineal patterns prepared as per TAYLOR & NETSCHER (1974), on the morphology of the mouth region of males (EISENBACK et al., 1981), and on the isoenzymatic phenotype for esterasis obtained from the technique by ESBENSHADE & TRIANTAPHYLLOU (1990), using a traditional vertical electrophoresis system, namely Mini Protean II by BIO-RAD.

A suspension containing eggs and second stage juveniles (J2) was prepared from tomato roots. 10 mL of the suspension was inoculated with eggplant and allowed to stand for 22 days. Thereafter, the eggplant was transplanted to pots and kept in the greenhouse. After 100 days, the roots of the eggplant were washed and ground in a blender with a solution of 0.5% sodium hypochlorite. The suspension was then passed through a sieve of 200 mesh (0.074 mm openings) on 500 (0.025 mm openings). The eggs and juveniles retained on the 500 mesh sieve were collected and washed.

Soybean seeds were treated with the compositions indicated in Table 7 below. The seeds were then inoculated with 3 mL of a suspension containing 5,000 eggs and second stage juveniles of *Meloidogyne javanica* recovered as described above.

TABLE 7

| Samples | Content | Rate (gram of amino acid and nutrients per 100 kg of seed material) |
|---|---|---|
| 1. Anti-nematode Composition | 12% amino acids; 10% micronutrients (zinc sulphate, sodium borate complex, iron sulphate, manganese sulphate and copper sulphate); 10% auxiliaries (including solvent, surfactant and stabilizer) in water | 24 |
| 2. Anti-nematode Composition | 12% amino acids; 10% micronutrients (zinc sulphate, sodium borate complex, iron sulphate, manganese sulphate and | 36 |

TABLE 7-continued

| Samples | Content | Rate (gram of amino acid and nutrients per 100 kg of seed material) |
|---|---|---|
| | copper sulphate); 10% auxiliaries (including solvent, surfactant and stabilizer) in water | |
| 3. Anti-nematode Composition | 12% amino acids; 10% micronutrients (zinc sulphate and sodium borate complex); 10% auxiliaries (including solvent, surfactant and stabilizer) in water | 24 |
| 4. Control | 0% amino acids; 0% micronutrients; 10% auxiliaries (including solvent, surfactant and stabilizer) in water | / |

19 days after sowing, the phytotoxic effects of the treatment were evaluated. No symptoms of phytotoxicity in the soybean plants were observed.

The number of galls on the plant roots and the number of galls in 10 grams of root material were counted 52 days after sowing. The results are set out in Table 8 below.

TABLE 8

| Samples | Number of galls on roots Day 52 (Days after sowing) | Number of galls on 10 grams of roots Day 52 (Days after sowing) |
|---|---|---|
| 1. Anti-nematode Composition | 1.7 | 5.2 |
| 2. Anti-nematode Composition | 4.2 | 7.6 |
| 3. Anti-nematode Composition | 2.3 | 5.4 |
| 4. Control | 16.8 | 33.6 |

The number of eggs and *Meloidogyne javanica* in the plant roots and the number of eggs and *Meloidogyne javanica* in 10 grams of root material were counted at 52 and 90 days after sowing. The results are set out in Table 9 below.

TABLE 9

| | Number of eggs and *Meloidogyne javanica* in roots | | Number of eggs and *Meloidogyne javanica* in 10 grams of roots | |
|---|---|---|---|---|
| Samples | Day 52 (Days after sowing) | Day 90 (Days after sowing) | Day 52 (Days after sowing) | Day 90 (Days after sowing) |
| 1. Anti-nematode Composition | 1939 | 12711 | 2874 | 13503 |
| 3. Anti-nematode Composition | 1917 | 11151 | 2688 | 12051 |
| 4. Control | 2829 | 99213 | 5475 | 64148 |

As can be seen, treatment of the sugarcane plants with the anti-nematode composition comprising amino acids and micronutrients significantly reduced the number of nematodes present in the roots of the plants, compared with the Control.

EXAMPLE 4—*Pratylenchus brachyurus*—Coffee

A nematode inoculum was prepared from a pure subpopulation of *Pratylenchus* brachyurus kept in soybean plants (*Glycine max* L.) in clay recipients in a greenhouse. The subpopulation was previously identified based on morphological characters of perineal patterns, on the morphology of the mouth region, and on the isoenzymatic phenotype for esterasis.

3 mL samples of the compositions summarised in Table 10 below were applied uniformly on the soil and around the roots at the rate of 2 L/ha. Thereafter, the roots of the young coffee plants were inoculated with 10 mL of a suspension containing *Pratylenchus brachyurus* in various developmental stages, after which the roots were covered with soil. 5 replicates were carried out.

TABLE 10

| Samples: | Weight (%) by the weight of the anti-nematode composition: |
|---|---|
| 1. Anti-nematode composition | 4% amino acids; 12% micronutrients (89 g/L zinc sulphate and 31 g/L disodium octaborate); 10% auxiliaries (including solvent, surfactant and stabilizer) in water |
| 2. Anti-nematode composition | 10% amino acids; 9.9% micronutrients (73.5 g/L zinc sulphate and 25.5 g/L disodium octaborate); 10% auxiliaries (including solvent, surfactant and stabilizer) in water |
| 3. Anti-nematode composition | 12% amino acids; 9.9% micronutrients (73.5 g/L zinc sulphate and 25.5 g/L disodium octaborate); 10% auxiliaries (including solvent, surfactant and stabilizer) in water |
| 4. Anti-nematode composition | 12% amino acids; 4% micronutrients (30 g/L zinc sulphate and 10 g/L disodium octaborate); 10% auxiliaries (including solvent, surfactant and stabilizer) in water |
| 5. Control | 0% amino acids; 0% micronutrients; 10% auxiliaries (including solvent, surfactant and stabilizer) in water |

After 15 and 30 days, the phytotoxic effects of the treatment were evaluated. No symptoms of phytotoxicity in the coffee plants were observed.

The number of *Pratylenchus brachyurus* in various developmental stages in the roots of the plants was counted 45 days after application. The results are set out in Table 11 below.

TABLE 11

| Samples | Number of *Pratylenchus brachyurus* in various development stages in 10 grams of roots Day 45 (Days after application) |
|---|---|
| 1. Anti-nematode composition | 27.12 |
| 2. Anti-nematode composition | 28.74 |
| 3. Anti-nematode composition | 24.10 |
| 4. Anti-nematode composition | 25.91 |
| 5. Control | 298.04 |

As can be seen, treatment of the coffee plants with the anti-nematode composition comprising amino acids and micronutrients significantly reduced the number of nematodes present in the roots of the plants, compared with the Control.

EXAMPLE 5—*Meloidogyne exigua*—Coffee

A nematode inoculum was prepared from a pure subpopulation of *Meloidogyne exigua* in tomato (*Solanum lycopersicom* L.) in clay recipients in a greenhouse. The subpopulation was previously identified based on morphological characters of perineal patterns, on the morphology of the mouth region, and on the isoenzymatic phenotype for esterasis.

3 mL samples of the compositions summarised in Table 12 below were applied uniformly on the soil and around the roots at the rate of 2 L/ha. Thereafter, the roots of the young coffee plants were inoculated with 10 mL of a suspension containing *Meloidogyne exigua* in various developmental stages, after which the roots were covered with soil. 5 replicates were carried out.

TABLE 12

| Samples: | Weight (%) by the weight of the anti-nematode composition |
|---|---|
| 1. Amino acids | 12% amino acids; 10% auxiliaries (including solvent, surfactant and stabilizer) in water |
| 2. Micronutrients (1) | 10% micronutrients (zinc sulphate and sodium borate complex); 10% auxiliaries (including solvent, surfactant and stabilizer) in water |
| 3. Micronutrients (2) | 10% micronutrients (zinc sulphate, sodium borate complex, iron sulphate, manganese sulphate and copper sulphate); 10% auxiliaries (including solvent, surfactant and stabilizer) in water |
| 4. Anti-nematode composition | 12% amino acids; 10% micronutrients (zinc sulphate and sodium borate complex); 10% auxiliaries (including solvent, surfactant and stabilizer) in water |
| 5. Anti-nematode composition | 12% amino acids; 10% micronutrients (zinc sulphate, sodium borate complex, iron sulphate, manganese sulphate and copper sulphate); 10% auxiliaries (including solvent, surfactant and stabilizer) in water |
| 6. Control | 0% amino acids; 0% micronutrients; 10% auxiliaries (including solvent, surfactant and stabilizer) in water |

After 15 and 30 days, the phytotoxic effects of the treatment were evaluated. No symptoms of phytotoxicity in the coffee plants were observed.

The number of *Meloidogyne exigua* in various developmental stages in the plant roots was counted 45 days after application. The results are set out in Table 13 below.

TABLE 13

| Samples | Number of *Meloidogyne exigua* in various development stages in 10 grams of roots Day 45 (Days after application) |
|---|---|
| 1. Amino acids | 80.66 |
| 2. Micronutrients (1) | 120.71 |
| 3. Micronutrients (2) | 100.93 |
| 4. Anti-nematode composition | 11.67 |
| 5. Anti-nematode composition | 10.45 |
| 6. Control | 220.64 |

As can be seen, the combination of amino acids and micronutrients was significantly more effective in the control of nematodes in the roots of the plants than the Control and either of the amino acids and micronutrients applied alone. The results indicate a synergistic effect between the amino acids and the micronutrients.

EXAMPLE 6—*Meloidogyne incognita*—Cotton

A nematode inoculum was prepared from a pure subpopulation of *Meloidogyne incognita* in tomato (*Solanum lycopersicom* L.) in clay recipients in a greenhouse. The subpopulation was previously identified based on morphological characters of perineal patterns, on the morphology of the mouth region, and on the isoenzymatic phenotype for esterasis.

3 mL samples of the compositions summarised in Table 14 below were applied uniformly on the soil and around the roots at the rate of 2 L/ha. Thereafter, the roots of the cotton plants were inoculated with 10 mL of a suspension containing *Meloidogyne incognita* in various developmental stages, after which the roots were covered with soil. 5 replicates were carried out.

TABLE 14

| Samples: | Weight (%) by the weight of the anti-nematode composition |
|---|---|
| 1. Anti-nematode composition | 12% amino acids; 10% micronutrients (zinc sulphate, sodium borate complex, iron sulphate, manganese sulphate and copper sulphate); 10% auxiliaries (including solvent, surfactant and stabilizer) in water |
| 2. Anti-nematode composition | 12% amino acids; 10% micronutrients (zinc sulphate and sodium borate complex); 10% auxiliaries (including solvent, surfactant and stabilizer) in water |
| 3. Control | 0% amino acids; 0% micronutrients; 10% auxiliaries (including solvent, surfactant and stabilizer) in water |

After 15 and 30 days, the phytotoxic effects of the treatment were evaluated. No symptoms of phytotoxicity in the cotton plants were observed.

The number of galls on 10 grams of root material was measured 45 days after application. The results are set out in Table 15 below.

TABLE 15

| Samples | Number of galls on 10 grams of roots Day 45 (Days after application) |
|---|---|
| 1. Anti-nematode composition | 1.6 |
| 2. Anti-nematode composition | 1.6 |
| 3. Control | 20.3 |

As can be seen, the combination of amino acids and micronutrients was significantly more effective in the control of nematodes in the roots of the plants than the Control.

EXAMPLE 7—*Heterodera glycines*—soybean

A nematode inoculum was prepared from a pure subpopulation of *Heterodera glycines* kept in soybean plants (*Glycine max* L.) in clay recipients in a greenhouse. The subpopulation was previously identified based on morphological characters of perineal patterns, on the morphology of the mouth region, and on the isoenzymatic phenotype for esterasis.

A suspension containing eggs and second stage juveniles (J2) was prepared from tomato roots. 10 mL of the suspension was inoculated with eggplant and allowed to stand for 22 days. Thereafter, the eggplant was transplanted to pots and kept in the greenhouse. After 100 days, the roots of the eggplant were washed and ground in a blender with a solution of 0.5% sodium hypochlorite. The suspension was then passed through a sieve of 200 mesh (0.074 mm openings) on 500 (0.025 mm openings). The eggs and juveniles retained on the 500 mesh sieve were collected and washed.

Soybean seeds were treated with the compositions indicated in Table 16 below. The seeds were then inoculated with 3 mL of a suspension containing 5,000 eggs and second stage juveniles of *Heterodera glycines* recovered as described above.

TABLE 16

| Samples: | Weight (%) by the weight of the anti-nematode composition |
| --- | --- |
| 1. Anti-nematode composition | 12% amino acids; 10% micronutrients (zinc sulphate, sodium borate complex, iron sulphate, manganese sulphate and copper sulphate); 10% auxiliaries (including solvent, surfactant and stabilizer) in water |
| 2. Anti-nematode composition | 12% amino acids; 10% micronutrients (zinc sulphate and sodium borate complex); 10% auxiliaries (including solvent, surfactant and stabilizer) in water |
| 3. Control | 0% amino acids; 0% micronutrients; 10% auxiliaries (including solvent, surfactant and stabilizer) in water |

After 19 days, the phytotoxic effects of the treatment were evaluated. No symptoms of phytotoxicity in the soybean plants were observed.

The number of galls on 10 grams of root material was measured 45 days after sowing. The results are set out in Table 17 below.

TABLE 17

| Samples | Number of galls on 10 grams of roots Day 45 (Days after sowing) |
| --- | --- |
| 1. Anti-nematode composition | 0.0 |
| 2. Anti-nematode composition | 1.0 |
| 3. Control | 19.4 |

As can be seen, the combination of amino acids and micronutrients was significantly more effective in the control of nematodes in the roots of the plants than the Control.

EXAMPLE 8—*Rotylenchulus reniformis*—Corn

A nematode inoculum was prepared from a pure subpopulation of *Rotylenchulus reniformis* in soybean plants (*Glycine max* L.) in clay recipients in a greenhouse. The subpopulation was previously identified based on morphological characters of perineal patterns, on the morphology of the mouth region, and on the isoenzymatic phenotype for esterasis.

3 mL samples of the compositions summarised in Table 18 were applied uniformly on the soil and around the roots at the rate of 2 L/ha. Thereafter, the roots of corn plants were inoculated with 10 mL of a suspension containing *Rotylenchulus reniformis* in various developmental stages, after which the roots were covered with soil. 5 replicates were carried out.

TABLE 18

| Samples: | Weight (%) by the weight of the anti-nematode composition |
| --- | --- |
| 1. Anti-nematode composition | 12% amino acids; 10% micronutrients (zinc sulphate, sodium borate complex, iron sulphate, manganese sulphate and copper sulphate); 10% auxiliaries (including solvent, surfactant and stabilizer) in water |
| 2. Anti-nematode composition | 12% amino acids; 10% micronutrients (zinc sulphate and sodium borate complex); 10% auxiliaries (including solvent, surfactant and stabilizer) in water |
| 3. Control | 0% amino acids; 0% micronutrients; 10% auxiliaries (including solvent, surfactant and stabilizer) in water |

After 15 and 30 days, the phytotoxic effects of the treatment were evaluated. No symptoms of phytotoxicity in the corn plants were observed.

The number of galls on 10 grams of root material was measured 45 days after application. The results are set out in Table 19 below.

TABLE 19

| Samples | Number of galls on 10 grams of roots Day 45 (Days after sowing) |
| --- | --- |
| 1. Anti-nematode composition | 1.2 |
| 2. Anti-nematode composition | 0.0 |
| 3. Control | 15.2 |

As can be seen, the combination of amino acids and micronutrients was significantly more effective in the control of nematodes in the roots of the plants than the Control.

The invention claimed is:

1. A method for controlling nematodes in plants at a locus, the method comprising applying to the locus a synergistic anti-nematode fertilizer composition consisting essentially of at least one amino acid and at least one micronutrient, the at least one micronutrient consisting of an ionic compound soluble in water, whereby the anti-nematode fertilizer composition contains no additional nematicide, insecticide, herbicide, or fungicide and the nematodes being controlled by the anti-nematode fertilizer composition includes at least one of *Pratylenchus zeae, Pratylenchus brachyurus, Meloidogyne exigua, Heterodera glycines,* and *Rotylenchulus reniformis* nematodes wherein the micronutrients comprises copper (Cu), iron (Fe), manganese (Mn), zinc (Zn), sodium (Na), sulphate, and borate ions and;

wherein the at least one amino acid and the at least one micronutrient are applied in a weight ratio of the amino acid and micronutrient in the range of from 20:1 to 1:20.

2. The method according to claim 1, wherein the plants comprise a crop selected from cereals, fruit, leguminous plants, sugarcanes, oil plants, cucurbitaceae, fibre plants, citrus, vegetables, coffee, and ornamentals.

3. The method according to claim 2, wherein the crop is selected from wheat, barley, rye, oats, corn, rice, sorghum, triticale, pomes, apples, grapes, pears, plums, peaches, almonds, pistachio, cherries, strawberries, raspberries, blackberries, beans, lentils, peas, soybeans, rape, mustard, sunflowers, marrows, cucumbers, melons, cotton, flax, hemp, jute, calamondin, citrus citron, chironja, tangelo, tangor, grapefruit, kumquat, lemon, lime, mandarin (tangerine), sour orange, sweet orange, pummelo, satsuma mandarin, spinach, lettuce, asparagus, cabbages, carrots, onions, tomatoes, potatoes, paprika, roses, shrubs, broad-leaved trees and evergreens.

4. The method according to claim 2, wherein the crop is selected from sugarcane, soybean, coffee, corn and cotton.

5. The method according to claim 1, wherein the at least one amino acid is selected from alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, L-Alanine, L-Arginine, L-Aspartic acid, L-Cystine, L-Glutamic acid, Glycine, L-Histidine, L-Isoleucine, L-Leucine, L-Lysine, L-Methionine, L-Phenylalanine, L-Proline, L-Serine, L-Threonine, L-Tyrosine, and L-Valine.

6. The method according to claim 1, comprising applying to the locus at least two amino acids.

7. The method according to claim 1, wherein the at least one micronutrient contains ions of perborates, pentaborates, triborates, tetraborates, octaborates and metaborates.

8. The method according to claim 1, comprising applying to the locus a plurality of micronutrients.

9. The method according to claim 8, wherein the plurality of micronutrients comprises at least zinc, sulphate, sodium, and borate ions.

10. The method according to claim 1, wherein the micronutrients comprise a sodium borate and a zinc salt.

11. The method according to claim 10, wherein the sodium borate is disodium octaborate.

12. The method according to claim 10, wherein the zinc salt is zinc sulphate.

13. The method according to claim 10, wherein the sodium borate and the zinc salt are applied in a weight ratio of from 1:6 to 4:1.

14. The method according to claim 1, wherein the at least one amino acid and the at least one micronutrient are applied in a weight ratio of the amino acid and micronutrient in the range of from 10:1 to 1:10.

15. The method according to claim 14, wherein the at least one amino acid and the at least one micronutrient are applied in a weight ratio of the amino acid and micronutrient in the range of from 5:1 to 1:5.

16. The method according to claim 15, wherein the at least one amino acid and the at least one micronutrient are applied in a weight ratio of the amino acid and micronutrient in the range of from about 1.5:1 to about 1:1.5.

17. The method according to claim 1, wherein the at least one amino acid is applied to the locus as a spray at an application rate of from 5 to 2000 g/ha.

18. The method according to claim 1, wherein the at least one micronutrient is applied to the locus as a spray at an application rate of from 1 to 2000 g/ha.

19. The method according to claim 1, wherein the at least one amino acid is applied as a seed treatment to seeds at a rate of from 0.5 to 200 g per 100 kg of seeds.

20. The method according to claim 1, wherein the at least one micronutrient is applied as a seed treatment to seeds at a rate of from 0.1 to 200 g per 100 kg of seeds.

21. A method for controlling nematodes in plants at a locus, the method comprising applying to the locus a synergistic anti-nematode fertilizer composition consisting essentially of at least one amino acid and micronutrients, the micronutrients consisting of disodium octaborate and zinc sulphate wherein the anti-nematode fertilizer composition contains no additional nematicide, insecticide, herbicide, or fungicide;

wherein the at least one amino acid and the micronutrients are applied in a weight ratio of the amino acid and micronutrient in the range of from 20:1 to 1:20 and the nematodes being controlled by the anti-nematode fertilizer composition includes at least one of *Pralyienchus zeae, Pratylenchus brachyurus, Meloidogyne exigua, Heterodera glycines*, and *Rofyienchulus reniformis* nematodes.

22. A method for controlling nematodes in plants at a locus, the method comprising applying to the locus a synergistic anti-nematode fertilizer composition consisting essentially of at least one amino acid and micronutrients, the micronutrients consisting of disodium octaborate and zinc sulphate, wherein the anti-nematode fertilizer composition contains no additional nematicide, insecticide, herbicide, or fungicide and the disodium octaborate and the zinc sulphate are applied in a weight ratio of from 1:6 to 4:1 and the nematodes being controlled by the anti-nematode fertilizer composition includes at least one of *Pratylenchus zeae, Pratyienchus brachyurus, Meloidogyne exigua, Heterodera glycines*, and *Rotyietichulus reniformis* nematodes.

* * * * *